United States Patent
Creamer et al.

(10) Patent No.: US 6,694,002 B2
(45) Date of Patent: Feb. 17, 2004

(54) GENERIC SERVICE COMPONENT FOR WIRELESS SERVICES

(75) Inventors: Thomas E. Creamer, Boca Raton, FL (US); Samuel Kallner, Yaakov (IL); Victor S. Moore, Boynton Beach, FL (US); Gal Shachor, Yokneam (IL); Glen R. Walters, Hollywood, FL (US)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 09/884,497

(22) Filed: Jun. 18, 2001

(65) Prior Publication Data
US 2002/0194396 A1 Dec. 19, 2002

(51) Int. Cl.[7] ............... H04M 3/42; H04M 7/00; G06F 9/46
(52) U.S. Cl. ............... 379/201.12; 379/221.08; 379/221.09; 379/221.15; 455/414.1; 709/250; 709/328
(58) Field of Search ............... 370/259; 379/201.01, 379/201.02, 201.03, 201.05, 201.12, 221.08, 221.09, 221.15; 455/414.1; 709/203, 223, 224, 226, 229, 250, 318, 328

(56) References Cited

U.S. PATENT DOCUMENTS

| | | | | |
|---|---|---|---|---|
| 5,526,415 A | * | 6/1996 | Wakamoto | 379/230 |
| 5,557,798 A | | 9/1996 | Skeen et al. | 709/215 X |
| 5,721,909 A | | 2/1998 | Oulid-Aissa et al. | 707/10 |
| 5,812,533 A | | 9/1998 | Cox et al. | 370/259 |
| 5,907,607 A | | 5/1999 | Waters et al. | 379/201.3 |
| 6,002,941 A | * | 12/1999 | Ablay et al. | 455/518 |
| 6,125,388 A | | 9/2000 | Reisman | 709/218 |
| 6,338,088 B1 | * | 1/2002 | Waters et al. | 709/226 |

OTHER PUBLICATIONS

W. Seigneur, *The Open Architecture Distributed Switching Model, Building the Network Operating System for the Information Superhighway*, SONeTech, Inc, (Mar. 2001).
Keijzer, et al., *JAIN: A New Approach to Services in Communication Networks*, pp. 94–99, IEEE Communications Magazine, (Jan. 2000).
Jain, et al., *Java Call Control, Coordination, and Transactions*, pp. 108–114, IEEE Communications Magazine, (Jan. 2000).
Beddus, et al., *Opening Up Networks with JAIN Parlay*, pp. 136–143, IEEE Communications Magazine, (Apr. 2000).
Bhat, et al., *JAIN Protocol APIs*, pp. 100–107, IEEE Communications Magazine, (Jan. 2000).
S. Silberstang, *Service Creation for Advanced Intelligent Networks Utilizing Intelligent Peripherals*, (Mar. 2001).
Keijzer, et al., *The Telephony Interoperability Challenge*, Sun Journal, (Mar. 2001).
JAIN™: *Integrated Network APIs for the JAVA™ Platform*, (Sep. 2000).
JAIN™ SCE/SLEE API Specificaton, (Mar. 2001).

* cited by examiner

Primary Examiner—Harry S. Hong
(74) Attorney, Agent, or Firm—Akerman Senterfitt

(57) ABSTRACT

An advanced intelligent network for use with a wireless service can include a service logic execution environment (SLEE), at least one service application executing in the SLEE, and at least one generic service component for use with a wireless service application communicatively linked to the service application. The generic service component can include an interface to the wireless service application which is external to the SLEE.

23 Claims, 4 Drawing Sheets

GENERIC SERVICE COMPONENT FOR WIRELESS SERVICES

BACKGROUND OF THE INVENTION

1. Technical Field

This invention relates to the field of telecommunications, and more particularly, to generic service components for wireless services for use with a service logic execution environment.

2. Description of the Related Art

The development of the open network application programming interface (API) represents an important departure from traditional methods for opening the architecture of the public switched telephone network (PSTN). Presently, the Advanced Intelligent Network (AIN) architecture defines a call model which allowes the creation of telecommunications service applications outside of the switch environment. Telecommunications service applications are a la carte telecommunications applications which can perform enhanced services for a telecommunications session established among two or more parties. Exemplary service applications can include Call Waiting, Caller ID, Call Forwarding, Voice Activated Dialing, and Meet-me Conferencing.

When AIN first had been introduced, in terms of the service application creation process, the AIN architecture represented an important advance. AIN separated service development from switching, allowing service logic components to be developed more quickly and placed in specialized network elements attached to databases. Switches, in turn, being free from all service logic, could be optimized for speed and efficiency. Still, typical service applications developed to the AIN specification are written in specialized languages by specially trained programmers using specialized service creation environments.

Importantly, future telecommunications networks will be characterized by new and evolving network architectures where packet-switched, circuit-switched, and wireless networks are integrated to offer subscribers an array of innovative multimedia, multiparty applications. Equally important, it is expected that the process by which telecommunications applications are developed will change, and will no longer solely be the domain of the telecommunications network or service application provider. In fact, in order to provide a broad portfolio of novel, compelling applications rapidly, service application providers will increasingly turn to third-party applications developers and software vendors. Thus, application development in the telecommunications domain will become more similar to that in software and information technology in general, with customers reaping the benefits of increased competition, reduced time to market, and the rapid leveraging of new technology as it is developed.

To make this vision a reality, the principles of AIN have been discarded in favor of a new service application component development paradigm. Specifically, it has been recognized that future integrated networks must offer application developers a set of standard, open APIs so that applications written for compatibility with one vendor's system can execute in the system of another vendor. In consequence, the cost of applications development can be amortized, reducing the final cost to the customer. Java APIs for Integrated Networks (JAIN) fulfills the requirements of the new service application component development paradigm. Presently, JAIN includes standard, open published Java APIs for next-generation systems consisting of integrated Internet Protocol (IP) or asynchronous transport mode (ATM) networks, PSTN, and wireless networks. The JAIN APIs include interfaces at the protocol level, for different protocols such as Media Gateway Control Protocol (MGCP), Session Initiation Protocol (SIP), and Transactional Capabilities Application Part (TCAP), as well as protocols residing in the higher layers of the telecommunications protocol stack.

JAIN includes a set of integrated network APIs for the Java platform and an environment to build and integrate JAIN components into services or applications that work across PSTN, packet and wireless networks. The JAIN approach integrates wireline, wireless, and packet-based networks by separating service-based logic from network-based logic. FIG. 1 illustrates a conventional JAIN implementation. As shown in FIG. 1, a conventional JAIN implementation can include a protocol layer 102 which can include interfaces to IP, wireline and wireless signaling protocols. These protocols can include TCAP, ISUP, INAP, MAP, SIP, MGCP, and H.323. The JAIN implementation also can include a signaling layer 103 which can include interfaces to provide connectivity management and call control. The conventional JAIN implementation also can include an application layer 104 for handling secure network access and other external services. Finally, the conventional JAIN implementation can include a service layer 106 which can include a service creation and carrier grade service logic execution environment (SLEE) 108.

In JAIN, the protocol layer 102 and the signaling layer 103 are based upon a Java standardization of specific signaling protocols and provide standardized protocol interfaces in an object model. Additionally, applications and protocol stacks can be interchanged, all the while providing a high degree of portability to the applications in the application layer using protocol stacks from different sources. By comparison, the application layer 104 provides a single call model across all supported protocols in the protocol layer 102. Fundamentally, the application layer 104 provides a single state machine for multiparty, multimedia, and multiprotocol sessions for service components in the application layer 104. This state machine is accessible by trusted applications that execute in the application layer 104 through a call control API.

Notably, applications or services executing at the service level 102 can communicate directly with protocol adapters in the SLEE 108. Protocol adapters typically are class methods, callbacks, event or interfaces that encapsulate the underlying resources such as TCAP, MGCP, etc. The underlying resources can be implemented in many programming languages, but a JAIN-conformant protocol product must provide at least the relevant JAIN API. In contrast, an external application or service executing in the application layer 104 does not have to be aware of the underlying resources and can remain oblivious to the fact that some of its session or call legs may be using different protocols.

Service components 112 are the core JAIN components and can execute in the SLEE 108. More particularly, service components 112 are constructed according to a standard component model and, instantiations of component assemblies can execute in coordination with the SLEE 108. Using information regarding the protocol layer 102 which can be incorporated into the SLEE 108, service components 112 can interact with the underlying protocol stacks without having specific knowledge of the protocol stack. Thus, service components 112 can use the call model provided by the signaling layer to implement telephony services. More importantly, the SLEE 108 can relieve the service components 112 of conventional lifecycle responsibilities by providing portable support for transactions, persistence, load balancing, security, and object and connection instance pooling. In this way, the service components 112 can focus on providing telephony services.

Despite the advantages provided by JAIN, however, the development of a wireless service application still requires knowledge of many disparate communications interfaces and protocols for accessing wireless services. For example, presently, a variety of disparate communications protocols exist which support the use of the wireless network. These protocols can include Global System for Mobile Communication (GSM), General Packet Radio Service (GPRS), Enhanced Data GSM Environment (EDGE), Universal Mobile Telecommunications System (UTMS), Wireless Application Protocol (WAP), Mobile Access Protocol (MAP), and i-Mode. In order to develop a wireless service application, a developer must be familiar with the particular wireless protocol interface corresponding to the wireless service or function being incorporated into the wireless service application being developed. For example, WAP is a specification for a set of communication protocols which standardizes wireless device communications. Thus, one developing a service application for wireless services for handheld devices would need at least a general familiarity with WAP to successfully develop such a service application. Similarly, a service application developer desiring to provide an application service providing interactive use of a web site through a wireless handheld device likely would need to be familiar with GPRS which can provide a higher data rate than WAP.

Solutions such as GPRS and WAP can facilitate the interoperability of various devices and services, as well as minimize the use of proprietary solutions. Still, to develop a variety of wireless service applications, a developer must be familiar with an assortment of wireless protocols and interfaces. Accordingly, the number persons having the necessary expertise in using different wireless communications protocols and interfaces can be limited. Typically, the knowledge required to implement a wireless application using a particular protocol can be so highly specialized that only one person may have the necessary expertise within a given organization. This personnel dilemma often means that each time a solution is developed for one particular wireless format, the solution is not easily ported over to a different wireless format or protocol. Moreover, because programming expertise can be so highly specialized, porting a service application to another format or protocol typically requires additional personnel possessing expertise within the target format or protocol.

In sum, the highly specialized nature of wireless service application development can result in increased developmental expenses and longer design cycles. Further, the complexities involved make recycling of systems, features, and applications extremely difficult.

SUMMARY OF THE INVENTION

The invention disclosed herein concerns a method and a system for providing a generic service component (GSC) for accessing wireless service applications for use with a service logic execution environment (SLEE). In particular, a GSC can provide a common application programming interface (API) for accessing a particular wireless service application. Correspondingly, each GSC can include the necessary functionality and protocol information for interacting with those wireless service applications. The GSC can hide protocol specific and interface specific details from the developer allowing the wireless service application to be accessed via the common API provided by the GSC. Accordingly, each GSC can be specifically suited to interact with the interface of a particular wireless service application while providing a common API to other GSCs and service applications executing within the SLEE. In this manner, the protocol and interface information specific to each wireless service application can be contained within a corresponding GSC.

One aspect of the invention can include an advanced intelligent network for use with a wireless service. The invention can include a SLEE, at least one service application executing in the SLEE, and at least one GSC for use with a wireless service application communicatively linked to the service application. The GSC can include an interface to the wireless service application which is external to the SLEE.

A second aspect of the invention can include a GSC for use in a telephony environment having a SLEE. The GSC can be registered with the SLEE and can interact with a wireless service application which can be external or internal to the SLEE. At least one client service instance can be included in the GSC where each client service instance can correspond to a wireless service application. Additionally, each client service instance can include a content interface for publishing an interface to the client service instance.

The GSC can include a service wrapper. The service wrapper can provide a common interface to at least one of the client service instances for routing events between the SLEE and the at least one client service instance. The service wrapper can include a deployment descriptor for providing configuration information to the SLEE and a service interface for publishing an interface to the service wrapper. Also, the service wrapper can include a protocol stack for managing communications in a telephony environment. Notably, the GSC can interact with other GSCs, external applications, service components, or protocol stacks.

Another aspect of the invention can include a method of routing events between the SLEE and a GSC for use with a wireless service application in a telephony environment. In that case, the method can include the GSC registering with the SLEE and the GSC receiving a first event routed by the SLEE. The first event can correspond to a wireless service application which the GSC has registered to receive from the SLEE. Further the first event can be from a protocol stack, a service component, an external application, or another GSC. At least one client service instance can be instantiated for communicating with a wireless service application. The client service instance can interact with the wireless service application. A second event can be posted to the SLEE responsive to the interaction between the client service instance and the wireless service application. The second event can correspond to the interaction.

The method of the invention can be implemented in a machine readable storage, having stored thereon a computer program for routing events between a SLEE and a GSC in a telephony environment. Accordingly, the computer program can have a plurality of code sections executable by a machine for causing the machine to perform the steps of causing a GSC for use with a wireless service application to register with a SLEE and the GSC receiving a first event routed by the SLEE. The first event can correspond to a wireless service application which the GSC has been registered to receive from the SLEE. Notably, the first event can be from a protocol stack, a service component, an external application, or another GSC. The machine readable storage further can cause at least one client service instance for communicating with a wireless service application to be instantiated. The client service instance can interact with the wireless service application. Also, a second event can be posted to the SLEE responsive to the interaction between the client service instance and the wireless service application. The second event can correspond to the interaction.

BRIEF DESCRIPTION OF THE DRAWINGS

There are shown in the drawings embodiments of which are presently preferred, it being understood, however, that the invention is not so limited to the precise arrangements and instrumentalities shown.

DETAILED DESCRIPTION OF THE INVENTION

Figure 1:
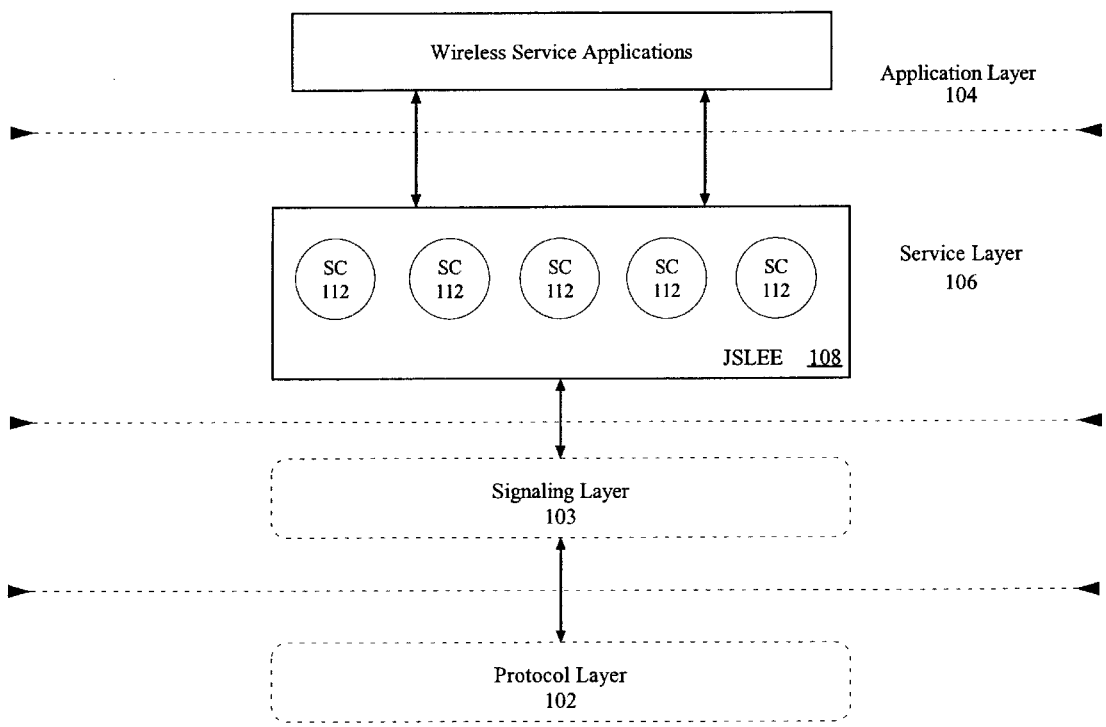
FIG. 1 is a schematic representation of an intelligent network architecture configured in accordance with a conventional JAIN implementation known in the prior art.

The invention disclosed herein concerns a method and a system for providing a generic service component (GSC) for accessing wireless service applications for use with a service logic execution environment (SLEE). In particular, a GSC can provide a common application programming interface (API) for accessing a particular wireless service application. Correspondingly, each GSC can include the necessary functionality and protocol information for interacting with those wireless service applications. The GSC can hide protocol specific and interface specific details from the developer allowing the wireless service application to be accessed via the common API provided by the GSC. Accordingly, each GSC can be specifically suited to interact with the interface of a particular wireless service application, while providing a common API to other GSCs and service applications executing within the SLEE. In this manner, the protocol and interface information specific to each wireless service application can be contained within a corresponding GSC. By providing a uniform interface which does not vary among wireless protocols, and through which wireless service applications can be accessed, the invention disclosed herein facilitates faster and more efficient development of wireless service applications.

For example, a GSC can be configured for accessing a wireless service application based upon wireless application protocol (WAP). WAP is specific to a particular wireless service application or function. In order for a developer to access the WAP interface, the interface must be exposed and in some cases understood by the developer. If other wireless service applications or functions are to be included within a particular wireless service application, the developer must have a familiarity with the underlying protocols of those service applications or functions as well. The GSC relieves the developer from having to be familiar with various wireless service protocols and interfaces. Accordingly, the developer need only know a single wireless interface, the common API for accessing a GSC which does not vary among disparate wireless protocols. Thus, the developer need only be concerned with knowing a single common API for wireless service applications and functions without regard to the underlying interfaces and protocols hidden by the GSCs.

In another aspect of the present invention, the GSCs can communicate with one another, in addition to wireless service applications, external service applications (service applications running outside of the SLEE), and service components. The ability to communicate amongst GSCs enables the GSCs to be combined in a hierarchical manner. In particular, once a service application is developed using one or more GSCs, that service application can be thought of as a GSC in and of itself. Accordingly, once a service application is built, the functionality of that service application can be accessed by other GSCs and other service applications. As a result, the distinction between a service application, a shared service capability or function, and communications interfaces can be lessened. Specifically, each of the aforementioned, whether a GSC for accessing a wireless service application or a function, can become an object, in this case a GSC, within the telephony environment. Thus, service applications can access GSCs for performing wireless service functions. Once built, the functionality of each service application further can be accessed by another higher level service application.

Figure 2:
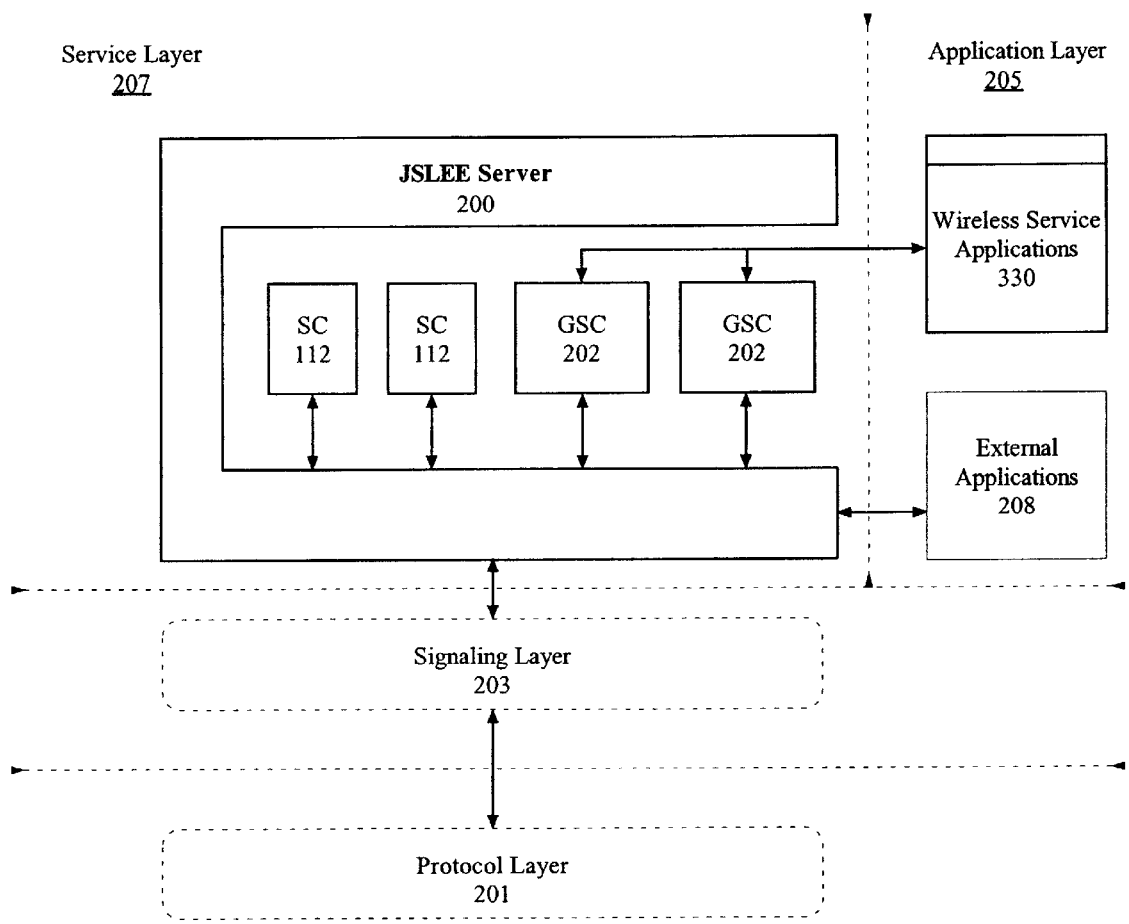
FIG. 2 is a schematic representation of an intelligent network architecture configured in accordance with the inventive arrangements disclosed herein.

FIG. 2 is a schematic illustration of a JAIN-compliant intelligent network configured in accordance with the inventive arrangements. A JAIN-compliant network configured in accordance with the inventive arrangements can include a protocol layer 201, a signaling layer 203, an application layer 205 and a service layer 207. The application layer 205 can host external third party applications 208 as well as wireless service applications 330. Typical third party applications 208 can suit mass-market demand for services such as virtual private networks (VPNs), inbound services and unified messaging. External third party applications 208 also can include short-lived and niche applications which can be deployed using un-trusted application space deployment technologies such as database lookup interfaces, downloadable mechanisms, and the Parlay API, as are well known in the art.

The service layer 207 can include a SLEE server such as a JSLEE Server 200 which can be configured for compatibility with the JAIN specification. The protocol layer 201 can include one or more protocol stacks which can be configured to interact with the service components 112 and the GSCs 202 executing in the JSLEE Server 200 through a signaling layer 203. Notably, the invention is not limited in regard to the number or type of protocol stacks. Rather, JSLEE Server 200 can interact with any protocol stack, for example those protocol stacks configured in accordance with the JAIN specification.

The GSCs 202 can provide a common API for accessing wireless service applications such as those utilizing Global System for Mobile Communication (GSM), General Packet Radio Service (GPRS), Enhanced Data GSM Environment (EDGE), Universal Mobile Telecommunications System (UTMS), WAP, Mobile Access Protocol (MAP), and i-Mode. A GSC can be built for each different wireless service application or function. Moreover, a GSC can be built for each different protocol used by a wireless service application. Thus, as shown in FIG. 2, a plurality of GSCs 202 can be included, each corresponding to a wireless service application, function, or protocol. For example, a different GSC can be build for WAP, GPRS, and EDGE based wireless service applications or functions.

The JSLEE Server 200 also can include several lifecycle management functions. In particular, the GSCs 202 can be properly loaded within the JSLEE Server 200 for execution. The JSLEE Server 200 can identify configuration and loading parameters associated with each GSC 202 to be loaded. Subsequently, the JSLEE Server 200 can execute the GSCs 202 using the identified configuration and loading parameters. Finally, the GSCs 202 can register with an internal event handling component in the JSLEE Server 200 so that events can be transmitted to and from the GSCs 202 executing in the JSLEE Server 200.

In operation, the JSLEE Server 200 can support the transmission and receipt of events to and from the protocol stacks in the protocol layer 201. More particularly, the events can be transmitted and received in the event handling component included in the JSLEE Server 200. Likewise, service components 112 and GSCs 202 which are registered with the JSLEE Server can receive protocol stack events directed towards particular ones of the service components 112 and the GSCs 202. More specifically, the event handling component can route received events to service components 112 which have registered with the JSLEE Server 200 to receive such events. The service components 112 and GSCs 202 further can post protocol stack events to the JSLEE Server 200.

Importantly, the JSLEE Server 200 also can receive and transmit messages among GSCs 202, service components 112, and between a GSC 202 and a service component 112. Specifically, GSCs 202 can be configured to post messages to the event handling component of the JSLEE Server 200. The GSCs 202 further can be registered with the JSLEE Server 200 to receive posted events from other GSCs 202 and service components 112. In this way, inter-GSC and service component communications can be made possible. Finally, GSCs 202 can be configured to receive events from external applications 208 through the JSLEE Server 200. For example, those events which are received from external applications 208 can be posted to the event handling component of the JSLEE Server 200. The events then can be routed to GSCs 202 that have registered to receive such events.

Figure 3:
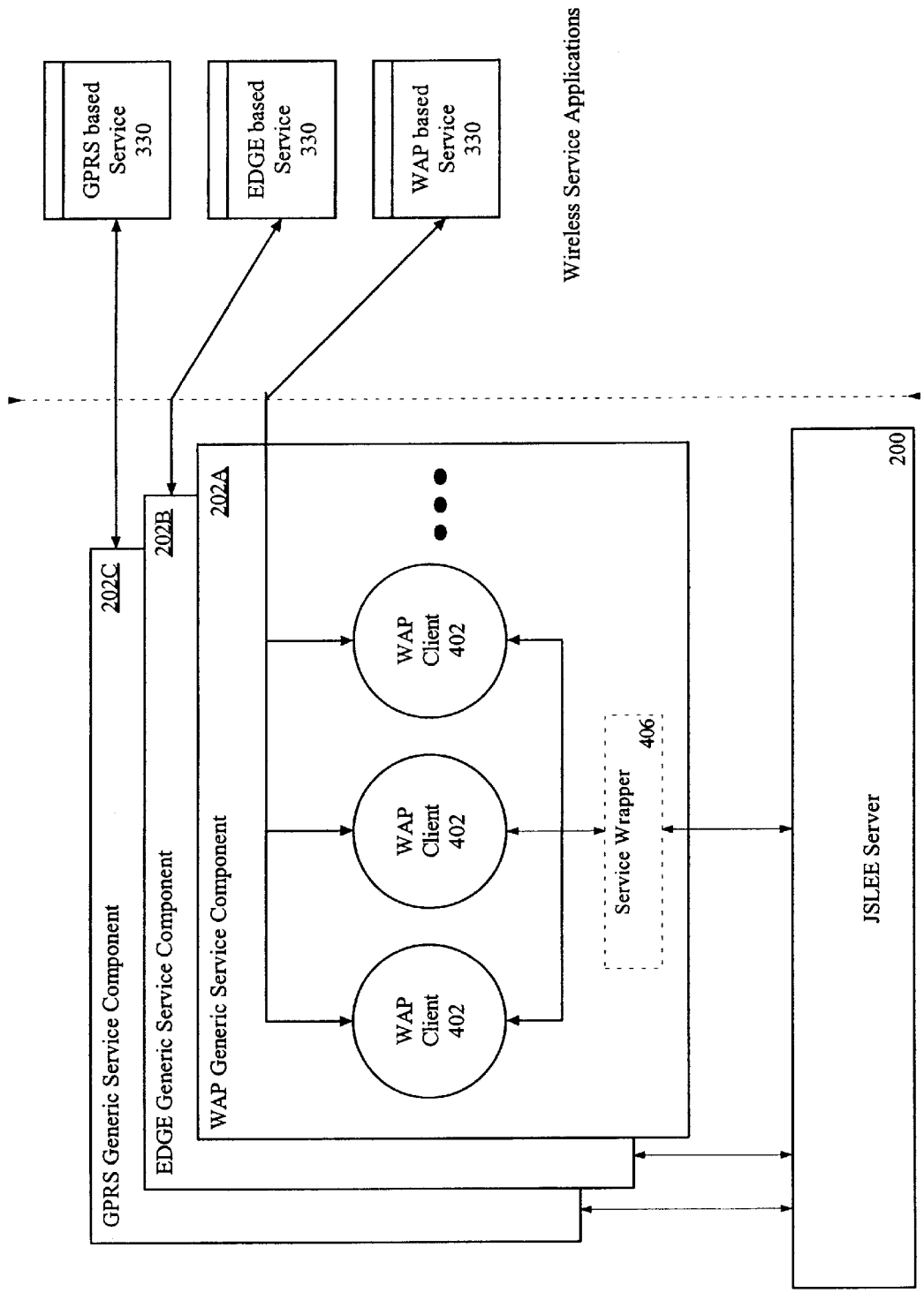
FIG. 3 is a pictorial representation of multiple exemplary generic service components for accessing wireless service applications from within the intelligent network architecture of FIG. 2.

FIG. 3 is a simplified pictorial representation of the exemplary GSCs 202 of FIG. 2. As shown in FIG. 3, a GSC can include a service wrapper 406 and one or more client service instances 402. The service wrapper 406 can register with the JSLEE Server to receive a particular type of event corresponding to a service application 330. Accordingly, the service wrapper 406 can include the functionality necessary to translate a received event and reformat that event according to a particular protocol. The reformatted event can be routed to a particular wireless service application. The service wrapper 406 can instantiate a client service instance 402 for processing a particular transaction or one or more events. The client service instance 402 also can be instantiated for communicating with a service application 330.

As shown in FIG. 3, in accordance with the inventive arrangements, exemplary GSCs can include, but are not limited to, a WAP GSC 202A, an EDGE GSC 202B, and a GPRS GSC 202C. For example, the service wrapper 406, as part of the WAP GSC 202A, can register with the JSLEE Server to receive wireless events relating to a wireless device such as a wireless handheld device. As shown in FIG. 3, the service wrapper 406 has instantiated three client service instances 402, one for each received event, or series of events comprising a transaction relating to a WAP based wireless service application. Alternatively, a single client service instance 402 can handle multiple transactions. Thus, each client service instance 402 can interact with the WAP based service application 330.

Similarly, the EDGE GSC 202B and the GPRS GSC 202C each can include a service wrapper and one or more client service instances for interacting with EDGE based and GPRS based wireless service applications 330 respectively. It should be appreciated that a GSC can be built for any wireless service application as necessary, including proprietary wireless services using proprietary interfaces and protocols.

Figure 4:
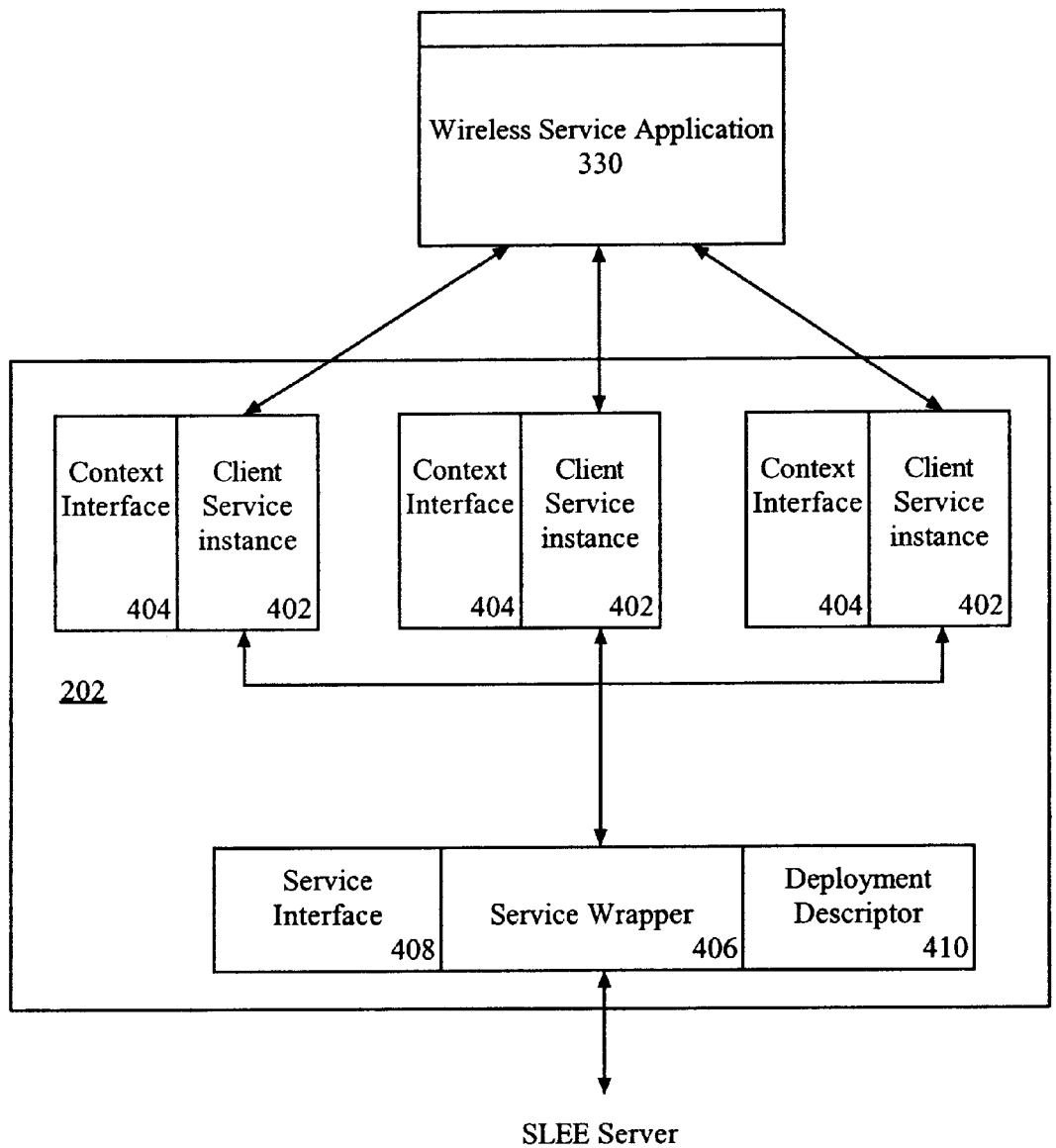
FIG. 4 is a schematic diagram illustrating an exemplary generic service component for use with wireless service applications.

FIG. 4 is a schematic diagram illustrating the exemplary GSC 202 of FIG. 3. As shown in FIG. 4, the GSC 202 can include a service wrapper 406 and one or more client service instances 402 as previously discussed. The client service instances 402 can be individually instantiated services. Each service instance 402 further can register with the event routing bus of the JSLEE Server. The GSC 202 also can include a service interface 408, a deployment descriptor 410, and one or more context interfaces 404. The deployment descriptor 410 can be a document, such as an XML document, which can describe the proper parameters for initially loading an instance of the GSC 202 in the JSLEE Server. The service interface 408 can publish the interface to the service wrapper 406 to external objects. Notably, the service interface 408 can be included as part of an XML document. Also, the interface to each client service instance 402 can be included as part of a corresponding context interface 404, which also can be published as part of an XML document.

The present invention can be realized in hardware, software, or a combination of hardware and software. A method and system for providing a GSC for use with a JSLEE according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program or application in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. An advanced intelligent network for use with a wireless service comprising:

a service logic execution environment (SLEE);

at least one service application executing in said SLEE; and at least one generic service component for use with a wireless service application communicatively linked to said service application, said generic service component comprising an interface to said wireless service application which is external to said SLEE.

2. In a telephony environment having a service logic execution environment (SLEE), a generic service component, being registered with the SLEE, for interacting with a wireless service application, said generic service component comprising:

at least one client service instance, each said client service instance corresponding to a wireless service application; and a service wrapper, said service wrapper providing a common interface to said at least one client service instance for routing events between the SLEE and said at least one client service instance.

3. The generic service component of claim 2, said service wrapper further comprising a deployment descriptor for providing configuration information to the SLEE.

4. The generic service component of claim 2, said service wrapper further comprising a service interface for publishing an interface to said service wrapper.

5. The generic service component of claim 2, said at least one client service instance further comprising a content interface for publishing an interface to said client service instance.

6. The generic service component of claim 2, wherein said generic service component interacts with other generic service components, external applications, service components, or protocol stacks.

7. The generic service component of claim 2, said service wrapper further comprising a protocol stack for managing communications in the telephony environment.

8. The generic service component of claim 2, wherein said wireless service application is external to the SLEE.

9. The generic service component of claim 2, wherein said wireless service component is internal to the SLEE.

10. In a telephony environment having a service logic execution environment (SLEE), a method of routing events between the SLEE and a generic service component for use with a wireless service application, said method comprising:

the generic service component registering with the SLEE; and the generic service component receiving a first event routed by the SLEE, said first event corresponding to a wireless service application which the generic service component has registered to receive from the SLEE.

11. The method of claim 10, further comprising:

instantiating at least one client service instance for communicating with a wireless service application, said client service instance interacting with said wireless service application.

12. The method of claim 11, further comprising:

posting a second event to the SLEE responsive to said interaction between said client service instance and said wireless service application, said second event corresponding to said interaction.

13. The method of claim 10, wherein said first event is from a protocol stack.

14. The method of claim 10, wherein said first event is from another generic service component.

15. The method of claim 10, wherein said first event is from a service component.

16. The method of claim 10, wherein said first event is from an external application.

17. A machine readable storage, having stored thereon a computer program having a plurality of code sections executable by a machine for causing the machine to perform the steps of:

a generic service component for use with a wireless service application registering with a service logic execution environment (SLEE); and the generic service component receiving a first event routed by the SLEE, said first event corresponding to a wireless service application which the generic service component has registered to receive from the SLEE.

18. The machine readable storage of claim 17, further comprising:

instantiating at least one client service instance for communicating with a wireless service application, said client service instance interacting with said wireless service application.

19. The machine readable storage of claim 18, further comprising:

posting a second event to the SLEE responsive to said interaction between said client service instance and said wireless service application, said second event corresponding to said interaction.

20. The machine readable storage of claim 17, wherein said first event is from a protocol stack.

21. The machine readable storage of claim 17, wherein said first event is from a service component.

22. The machine readable storage of claim 17, wherein said first event is from another generic service component.

23. The machine readable storage of claim 17, wherein said first event is from an external application.

* * * * *